United States Patent [19]
Garcia Lorenzen

[11] 4,037,518
[45] July 26, 1977

[54] MUSICAL CHORD AND NOTE CALCULATOR

[76] Inventor: Felix Hector Garcia Lorenzen, Dolores 265, Villa Sarmiento, Ramos Mejia, Buenos Aires, Argentina

[21] Appl. No.: 621,205

[22] Filed: Oct. 9, 1975

[30] Foreign Application Priority Data

| Oct. 11, 1974 | Argentina | 256066 |
| Apr. 25, 1975 | Argentina | 258512 |

[51] Int. Cl.² ............................................. G09B 15/02
[52] U.S. Cl. ..................................................... 84/474
[58] Field of Search ........................... 84/471 S R, 474

[56] References Cited

U.S. PATENT DOCUMENTS

| 148,097 | 3/1874 | Tillman | 84/474 |
| 229,545 | 7/1880 | McClain | 84/474 |
| 1,467,032 | 9/1923 | Florence | 84/474 |

FOREIGN PATENT DOCUMENTS

| 465,996 | 5/1937 | United Kingdom | 84/474 |

Primary Examiner—Lawrence R. Franklin
Attorney, Agent, or Firm—Michael J. Striker

[57] ABSTRACT

A diagramming musical harmonic calculator determines combinations of natural or altered degrees in the musical scale encompassing from traditional to contemporary harmony, comprising a main disk having a central spindle, and having marked on the surface thereof at least one annular note array concentric with the spindle, having twelve radial marks displaced 30° one from the other and corresponding to the twelve semitones in the tempered musical scale, and a plurality of indicating pieces capable of rotating around the spindle and bearing marks capable of coinciding with at least two marks in the main disk and allowing determination of different harmonic relations and combinations.

32 Claims, 37 Drawing Figures

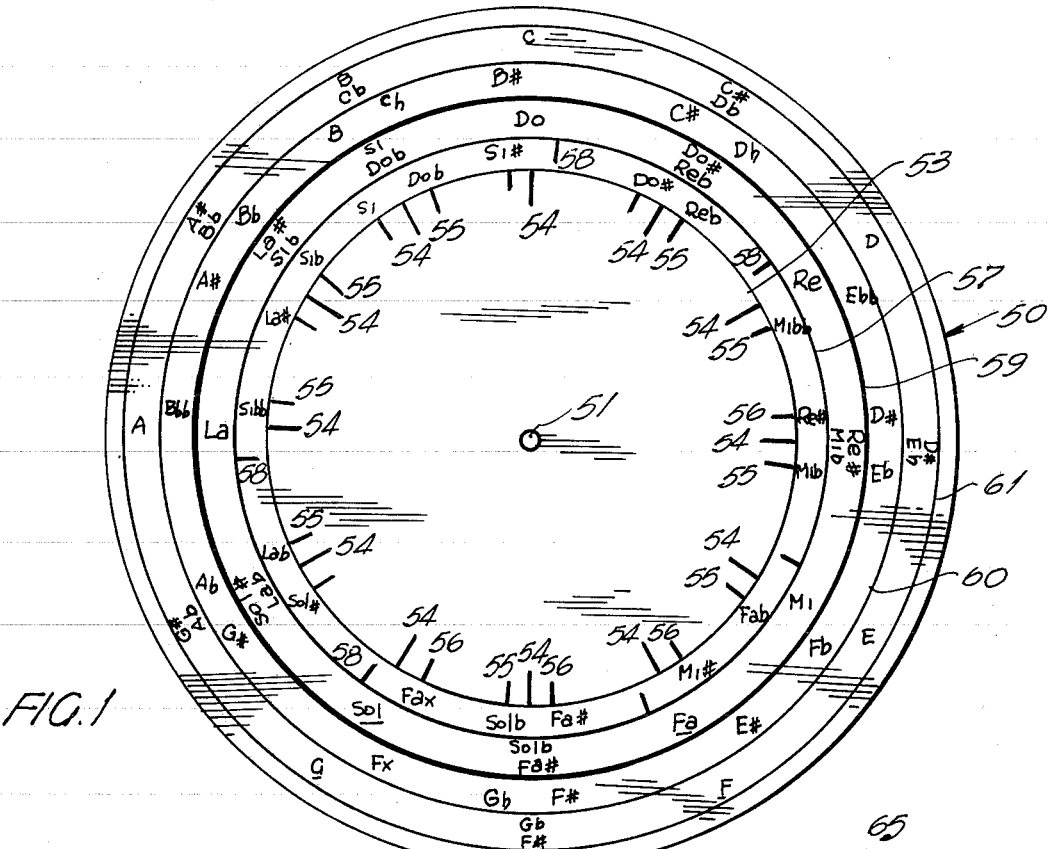
FIG.1
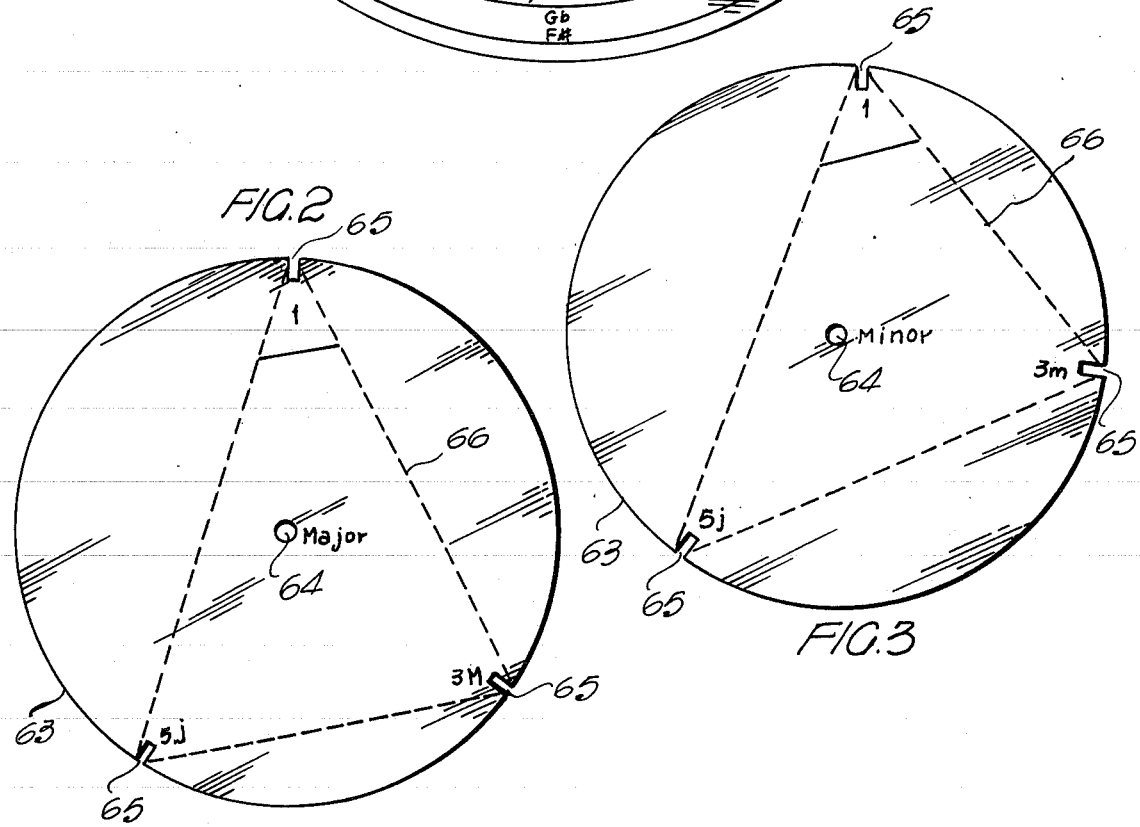
FIG.2
FIG.3

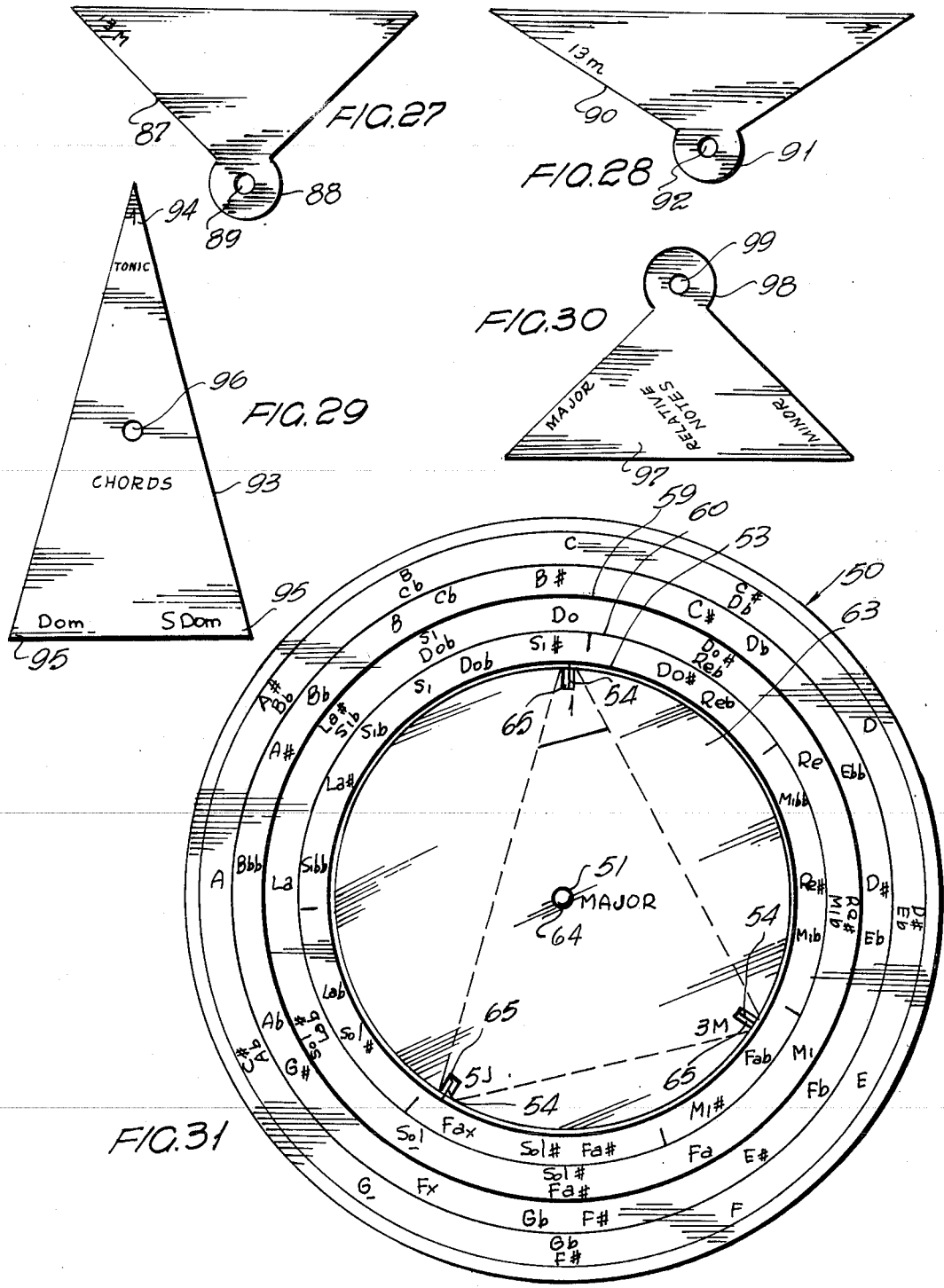

4,037,518

MUSICAL CHORD AND NOTE CALCULATOR

FIELD OF THE INVENTION

The present invention relates to a diagraming musical harmonic abacus or calculator comprising superposable pieces which by being rotated determine combinations of natural and/or altered degrees in the musical scale.

The purpose of the abacus is the functional exercise of harmony at the technical and/or vocational levels by geometric schematization of sound differentiations of tones and chords describing the structures applicable to the absolute chromatic notation.

The purpose of the abacus is to give immediately and accurately any type of tonal relation or chord, necessary for harmonizing or playing musical compositions, encompassing the whole of tonalities and shortening the time required by traditional studies.

The practical needs which originated the present invention are to hasten the conventional process of study of music in its harmonic aspect, guarantee results thereof, process in an abstract manner and safely musical composition and offer to the layman a field of analytical music action.

The diagramming harmonic musical abacus, as a mnemonic system operating under the forms of sonovisual relation, will resolve the technical difficulty of relation of intervals proper to the forming of the endless number of harmonic possibilities, bringing the advantages of a correct formation, accelerating all processes. It resolves the difficulty of memorizing specific schemes and/or definitions, presenting itself even as an entertainment or didactic musical game.

SUMMARY OF THE INVENTION

It is therefore an object of the present invention to provide a diagramming musical harmonic calculator or abacus which will allow one to determine formation of three, four, five, six and seven tone chords.

It is still another object of the present invention to provide a diagramming musical harmonic abacus which will allow one to determine the six chords in each tonality in the twelve semitones in the tempered musical scale, as well as the relative major and minor tones, or the tonal modulation, transposition and planification processes.

BRIEF DESCRIPTION OF THE DRAWING

In order that the present invention may be more easily comprehended it shall be discussed hereinafter with reference to a preferred embodiment thereof, with merely illustrative and not limitative purposes, reference being had to the accompanying drawings, in which:

FIG. 1 is a plan view of the main disk bearing the marks corresponding to the twelve semitones in the tempered musical scale;

FIGS. 2 to 7 are plan views of various disks each carrying inscribed triangular figures for forming three-note chords each;

FIGS. 27 and 28 are plan views of triangular pieces which superposed on the pieces of FIGS. 8 to 26 allow formation of chords of seven notes in the musical scale;

FIGS. 29 and 30 are plan views of triangular pieces which superposed on the main disk allow formation of tonal chords of any of the twelve semitones in the mucical scale;

FIG. 31 is a plan views showing the main disk partially covered by application of the FIG. 2 piece thereon, indicating the do major chord;

DETAILED DESCRIPTION

Figure 4:
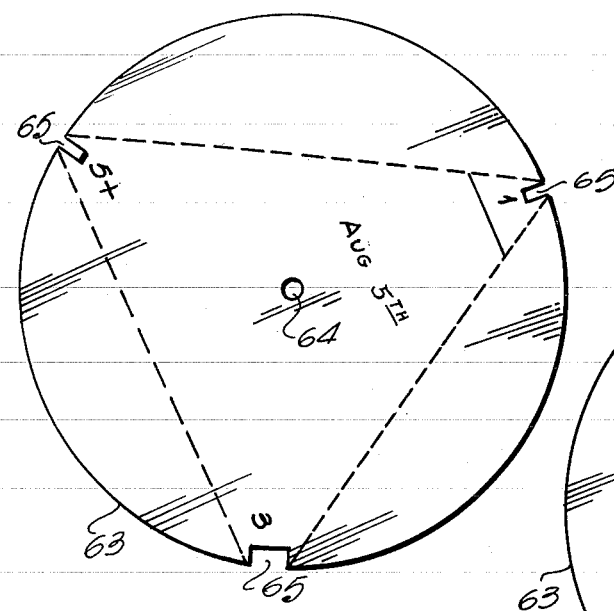

With reference to FIG. 1, the present invention includes a main disk 50 having at its center a spindle 51 perpendicularly projecting from the upper surface 52 of said disk 50.

On the surface 52 disk 50 carries printed or engraved in any suitable manner a circle or circumference 53 concentric with said spindle 51, and being provided with twelve radial indicia or marks 54 corresponding to the twelve semitones of the tempered musical scale, to wit, do, do sharp, re, re sharp, mi, fa, fa sharp, sol, sol sharp, la, la sharp and si.

Laterally to said radial marks 54 and displaced 5 degrees clockwise relative thereto radial marks 55 are arranged, being of a shorter length than radial marks 54 and corresponding to arrangement of flatted fifths, corresponding in successive order to re flat, mi double flat, fa flat, sol flat, la flat, si double flat, si flat and do flat.

Opposite to marks 55 relative to radial marks 54 and displaced 5° counterclockwise therefrom there are other radial marks 56 of a shorter length than radial marks 54 and of the same length as radial marks 55, and corresponding to arrangement of consecutive sharped fifths, corresponding in successive order to do sharp, re sharp, mi sharp, fa sharp, fa double sharp, sol sharp, la sharp, si and si sharp.

Concentrically and externally to circumference 53 there is disposed a second circle or circumference 57 having a slightly longer radius than circumference 53 and having radial marks 58 which, starting from radial mark 54 corresponding to C, are disposed at 5°, 55°, 115°, 215° and 265°, and corresponding to the arrangement of consecutive natural fifths which in successive order correspond to do, sol, re, la and mi.

Externally to second circumference 57 there is provided a third circle or circumference 59 likewise concentric thereto, serving to separate notation of the twelve semitones of the musical scale in the name system of Guido D'Arezzo from notation in the alphabetical system of names of Greek origin.

Externally to the third circumference 59 two further circles or circumferences 60 and 61 are provided, concentric with the others and having respectively larger diameters, the space defined between circumferences 60 and 61 having marked therein, in line with radial marks 54, the twelve semitones in the musical scale in the alphabetical system of Greek origin, to wit, C, C sharp, D, D sharp, E, F, F sharp, G, G sharp, A, A sharp and B.

In the space defined between circumferences 59 and 60 and corresponding with radial marks 56 the arrangement of sharped fifths is marked, which starting from C and clockwise in successive order comprises C sharp, D sharp, E sharp, F sharp, F double sharp, G sharp, A sharp and B sharp, while correspondingly with radial marks 55 the arrangement of flatted fifths is marked, which starting from C and in successive order comprises D flat, E double flat, E flat, F flat, G flat, A flat, B double flat, B flat and C flat.

From now on we shall refer, in the description of the other components of the invention, to the semitones in the musical scale using the names conceived by Guido D'Arezzo, but all of this is equally valid and applicable to the system of alphabetical nomenclature of Greek origin.

FIG. 2 shows a piece in the form of a disk 63 provided with a central bore 64 capable of fitting over spindle 51 and allowing rotation of the disk 53 over main disk 50. The diameter of disk 63 is equal to the diameter of innermost circumference 53 in the main disk 50. Disk 63 is provided with three peripheral notches 65 displaced 120, 90 and 150 degrees clockwise around the circumference and starting from the notch at the top marked 1, this being the notch to be positioned in coincidence with the radial mark 54 in main disk 50 corresponding to the musical note the chord of which one desires to form. For example, as shown in FIG. 31, the notch 65 carrying the number 1 is positioned in coincidence with radial mark 54 corresponding to musical note do. One can thus observe that the other two notches 65 coincide with radial marks 54 corresponding to notes mi and sol. That is to say that the do major chord is completed with notes mi and sol.

Disk 63 may be replaced with a triangular piece indicated at 66, that is, traced between notches 65, as illustrated in FIG. 2, but the disk-shaped piece is preferred because of its greater maneuverability and ease in locating the bore 64 over the spindle for rotation therearound.

FIG. 3 shows a piece similar to FIG. 2., the disk-shaped piece 63 having here the notches 65 displaced 90°, 120° and 150° therebetween, starting from the notch marked 1, so that when this disk-shaped piece is placed over the main disk 50 by inserting spindle 51 in bore 64, it permits determination of the minor chord of the twelve semitones in the musical scale. As in the preceding figure, disk-shaped piece 63 may be replaced with a triangular piece 66 resulting from joining notches 65.

FIG. 4 shows disk-shaped piece 63 with its central bore 64, wherein notches 65 are displaced 120°, 115° and 125° therebetween, which when placed over main disk 50 determines the augmented fifth chords.

Figure 5:
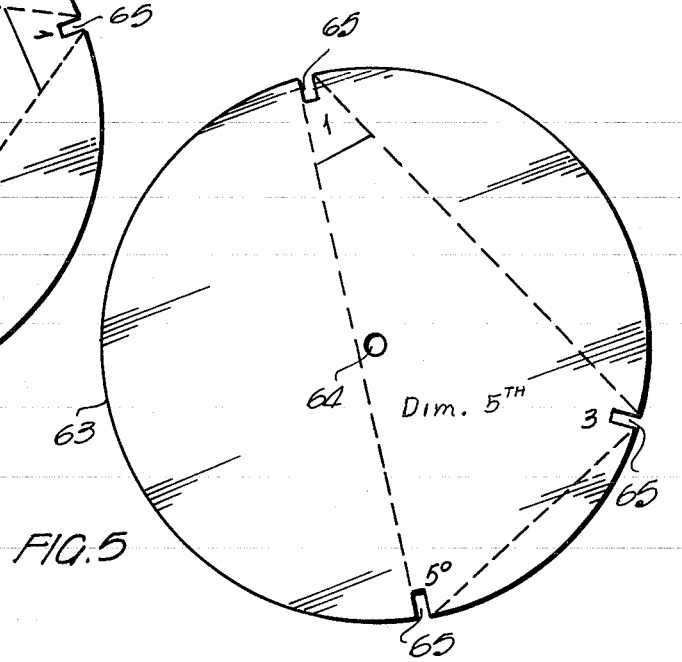

FIG. 5 shows another disk-shaped piece 63 having a central bore 64 and provided with notches 65 angularly spaced 120°, 65° and 175° therebetween, starting from the notch marked 1, so that when superposed on main disk 50 it is possible to determine the diminished fifth chords.

Figure 6:
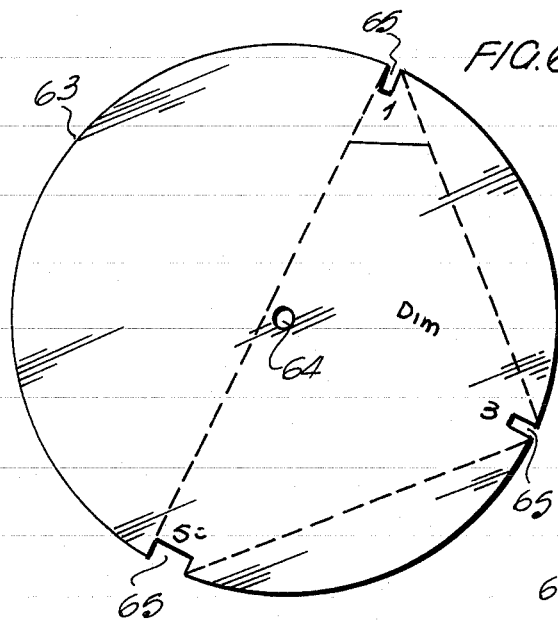

FIG. 6 shows a further disk-shaped piece 63 centrally bored at 64, having the notches 65 spaced 90°, 95° and 175° between each other starting from the notch marked 1, so that when piece 63 is superposed on main disk 50 it is possible to determine dinimished chords.

Figure 7:
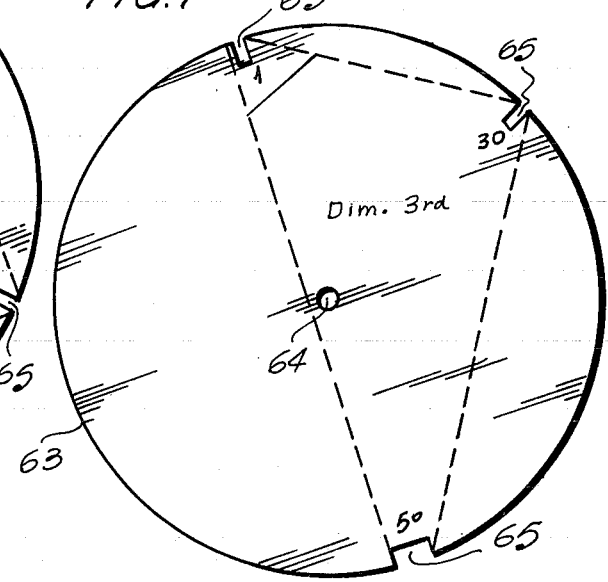

FIG. 7 shows another disk-shaped piece 63 having central bore 64 and with the notches 65 displaced 65°, 120 and 175° successively one from the other and starting from the notch marked 1, so that when the piece 65 is superposed on main disk 50 it is possible to determine the diminished third chords.

Figure 8:
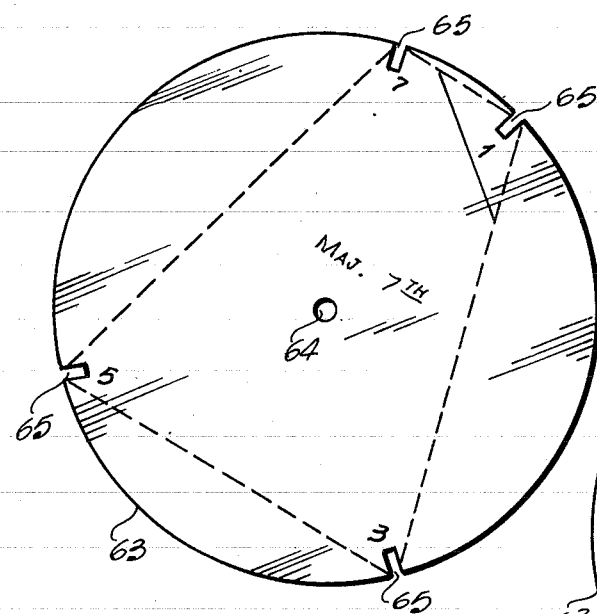
FIGS. 8 to 21 are plan views of various disks each carrying inscribed quadrilateral figures for forming chords of four notes each.

FIG. 8 shows a disk-shaped piece 63 with a central bore 64 wherein there are four notches 65 at the peripheral edge thereof displaced 120°, 90°, 120° and 30° one from the other, the notch located between the 30° and 120° spaces being marked with the number 1, so that when the piece 63 is applied over main disk 50 it is possible to determine the major major-seventh chords.

Figure 9:
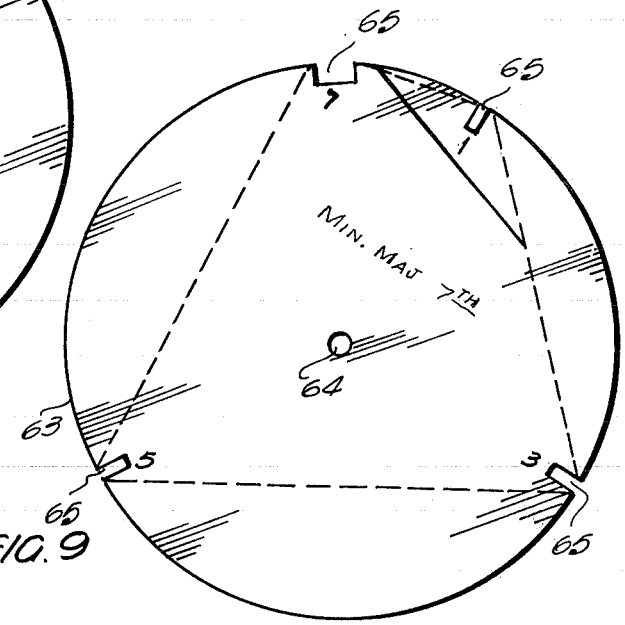

FIG. 9 shows disk-shaped piece 63 with a central bore 64, having four notches 65 displaced 90°, 120°, 120° and 30° one from the other, the notch included between the 30° and 90° spaces being marked with the number 1; upon superposition of piece 63 on the main disk 50 it is possible to determine the minor major-seventh chords.

Figure 10:
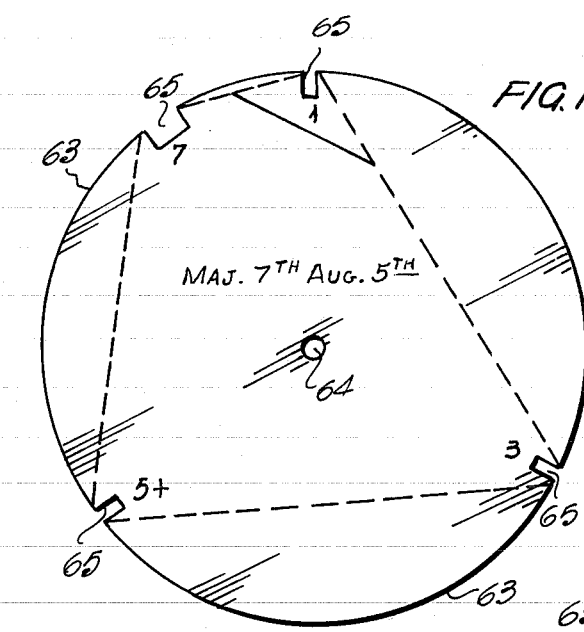

FIG. 10 shows disk-shaped piece 63, having a central bore 64, provided with four notches 65 spaced 120°, 115°, 90° and 35° successively therebetween, the notch located between the 35° and 120° spaces being identified by number 1, said piece 63 upon superposition over main disk 50 making it possible to determine the major seventh augmented fifth chords.

Figure 11:
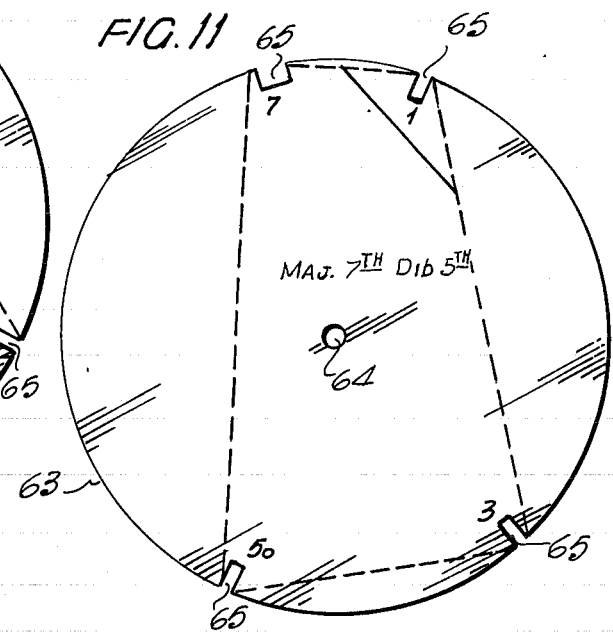

FIG. 11 shows disk-shaped piece 63 centrally bored at 64, having four notches 65 circumferentially spaced 120°, 65°, 140° and 35° successively therebetween, the notch located between the 35° and 120° spaces marked with a number 1; upon superposition of this piece 63 on the main disk 50 it is possible to determine the major seventh diminished fifth chords.

Figure 12:
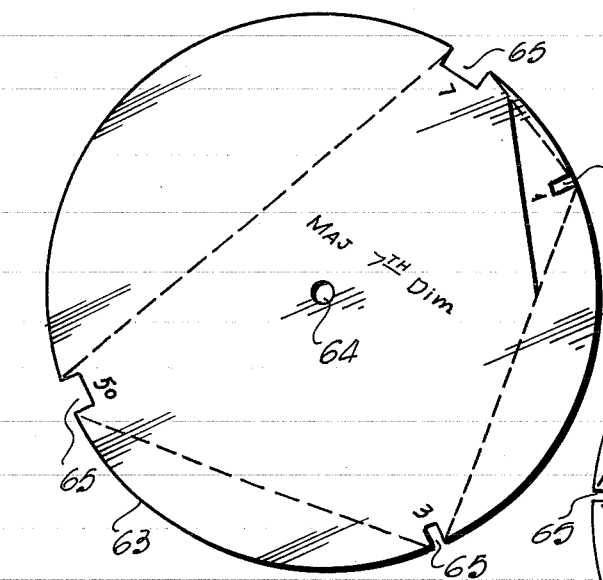

FIG. 12 shows disk-shaped piece 63, having a central bore 64, provided with four notches 65 circumferentially spaced 90°, 95°, 140° and 35° therebetween, the notch included between the 35° and 90° spaced being marked with a number 1, said piece when superposed on main disk 50 allowing determination of major seventh diminished chords.

Figure 13:
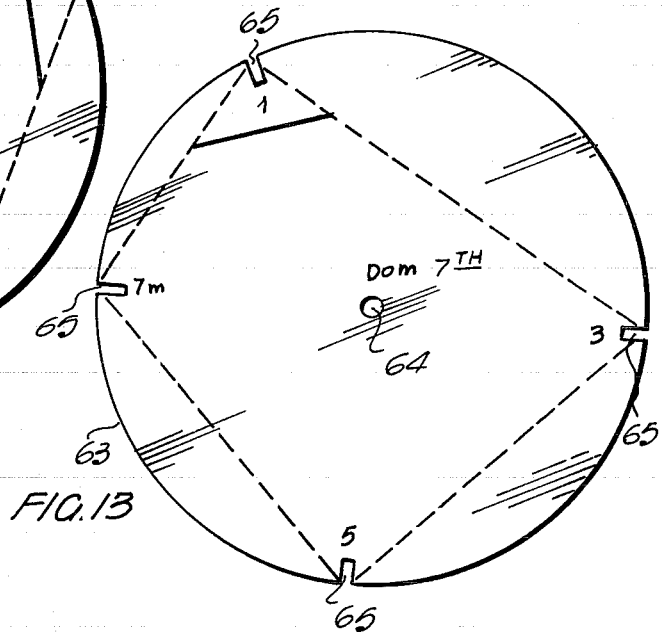

FIG. 13 shows a disk-shaped piece 63 with a central bore at 64, having four notches 65 circumferentially spaced 120°, 90°, 90° and 60° successively therebetween, the notch included between the 60° and 120° spaces being marked with a number 1, so that upon superposition on the main disk 50 of said piece it is possible to determine the minor seventh major or dominent seventh chords.

Figure 14:
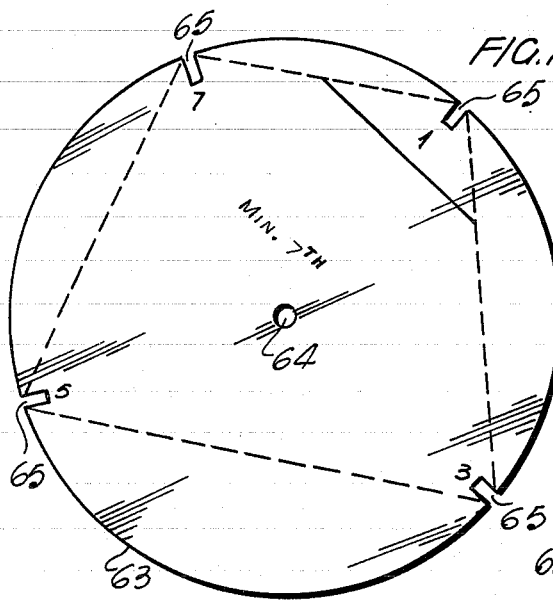

FIG. 14 shows a disk-shaped piece 63 with a central bore at 64, having four notches 65 circumferentially spaced 90°, 120°, 90° and 60° successively therebetween, the notch included between the 60° and 90° spaces being marked with a number 1, so that upon superposition on the main disk 50 of said piece it is possible to determine the minor seventh chords.

Figure 15:
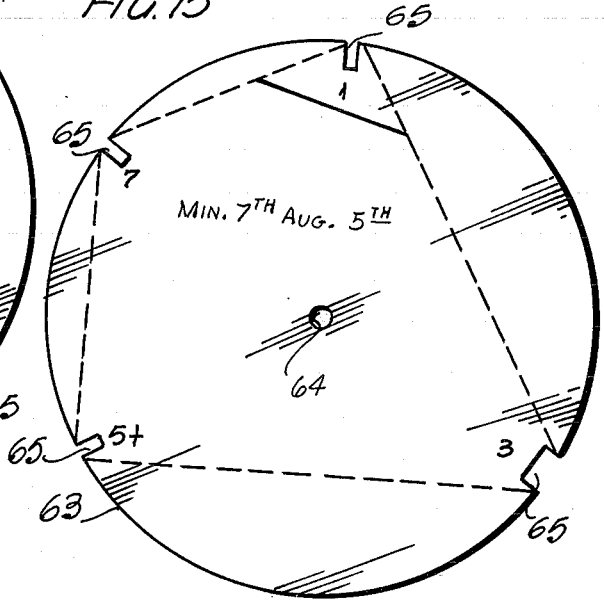

FIG. 15 shows disk-shaped disk 63 with a central bore at 64, having four notches 65 circumferentially spaced 120°, 115°, 65° and 60° successively therebetween, the notch included between the 60° and 120° spaces being marked with a number 1, so that upon superposition of the piece 65 on main disk 50 it is possible to determine the minor seventh augmented fifth chords.

Figure 16:
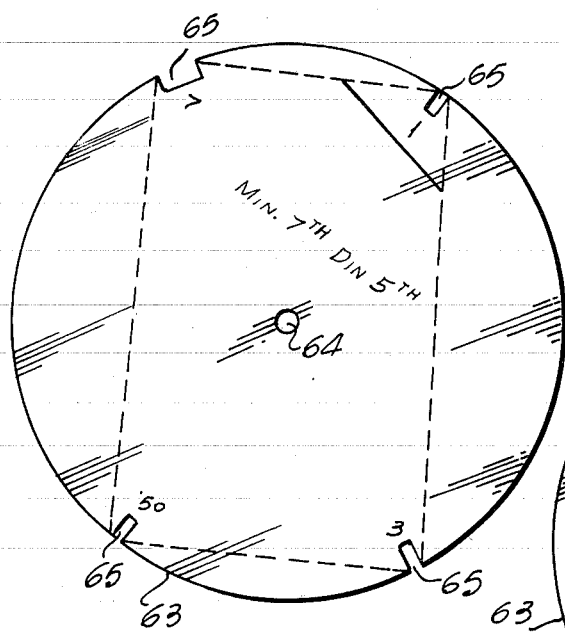

FIG. 16 shows disk-shaped piece 63 with a central bore at 64, having four notches 65 circumferentially spaced 120°, 65°, 120° and 55° successively therebetween, the notch included between the 55° and 120° spaces being marked with a number 1, so that upon superposition of the piece 63 on main disk 50 it is possible to determine the minor seventh diminished fifth chords.

Figure 17:
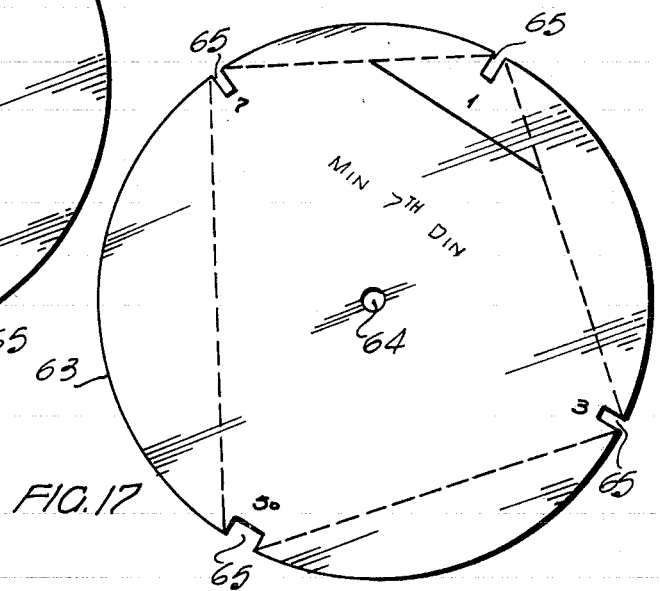

FIG. 17 shows disk-shaped piece 63 with a central bore at 64, having four notches 65 circumferentially spaced 90°, 95°, 115° and 60° successively therebetween, the notch included between the 60° and 90° spaces being marked with a number 1, so that upon superposition of said piece on main disk 50 it is possible to determine the minor seventh diminished chords.

Figure 18:
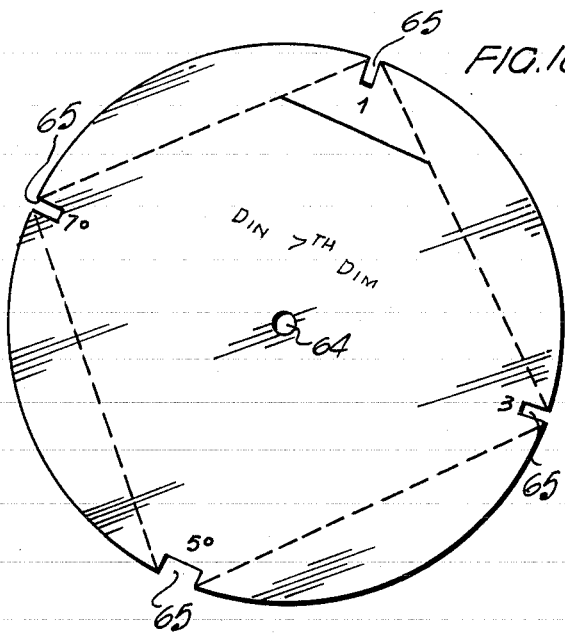

FIG. 18 shows disk-shaped piece 63 with a central bore at 64, having four notches 65 circumferentially spaced 90°, 95°, 90° and 85° successively therebetween, the notch included between the 85° and initial 90° spaces being marked with a number 1, so that upon superposition of said piece 63 on main disk 50 it is possible to determine the diminished seventh diminished chords.

Figure 19:
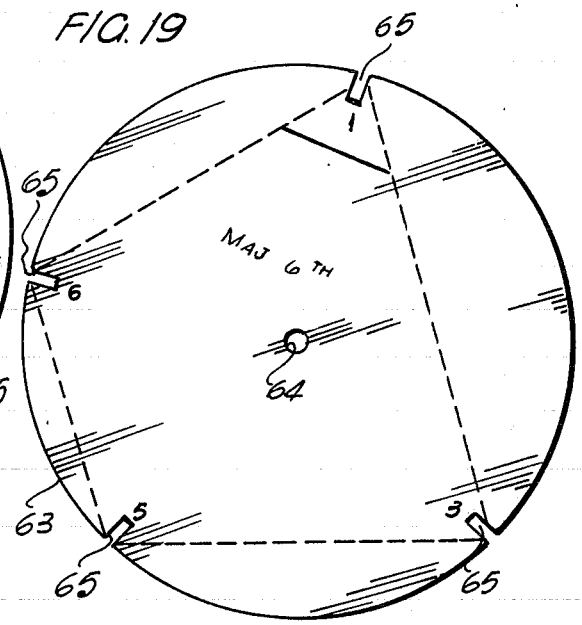

FIG. 19 shows disk-shaped piece 63 with a central bore therein at 64, having four notches 65 circumferentially spaced 120°, 90°, 60° and 90° successively therebetween, the notch included between the last 90° space and the 120 space being marked with a number 1, so that upon superposition of piece 63 on main disk 50 it is possible to determine the major sixth chords.

Figure 20:
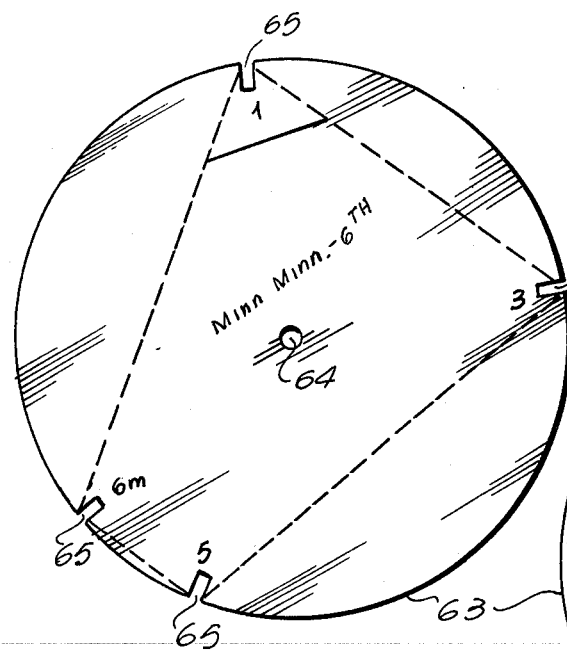

FIG. 20 shows a further disk-shaped piece 63 with a central bore indicated at 64, having four notches 65 circumferentially spaced 90°, 120°, 30° and 120° successively therebetween, the notch included between the 120° and 90° spaces being marked with a number 1, so that upon superposition of disk-shaped disk 63 on main disk 50 it is possible to determine the minor minor-sixth chords.

Figure 21:
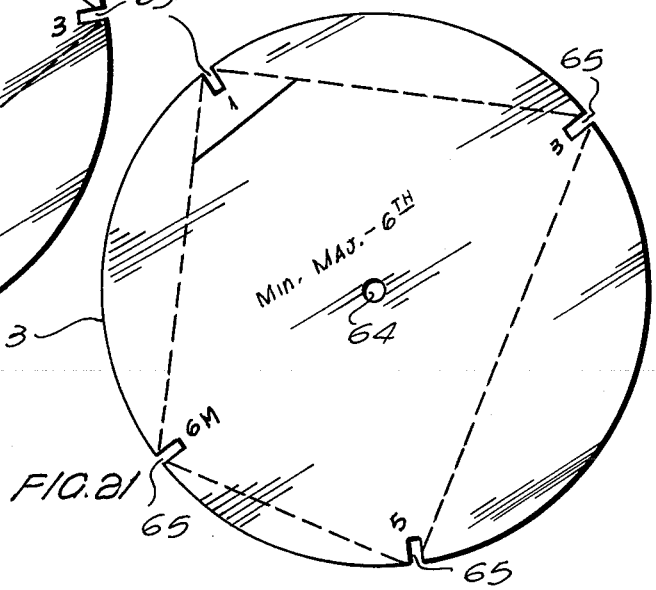

FIG. 21 shows another disk-shaped piece 63 with a central bore at 64, having four notches 65 circumferentially spaced 90°, 120°, 60° and 90° consecutively therebetween, the notch included between the last and first 90° spaces being marked with a number 1, so that upon superposition of piece 63 on the main disk 50 it is possible to determine the minor major-sixth chords.

It is evident that in all the FIGS. 2 to 21 the disk-shaped piece 63 may be replaced with a polygonal piece 66, either a triangle or quadrilateral, formed by joining consecutive notches 65 with straight lines; on the other hand, in one disk 63 or polygonal piece 66 more notches 65 may be formed 50 as to determine two or more chords, without thereby departing from the scope of the present invention.

Figure 32:
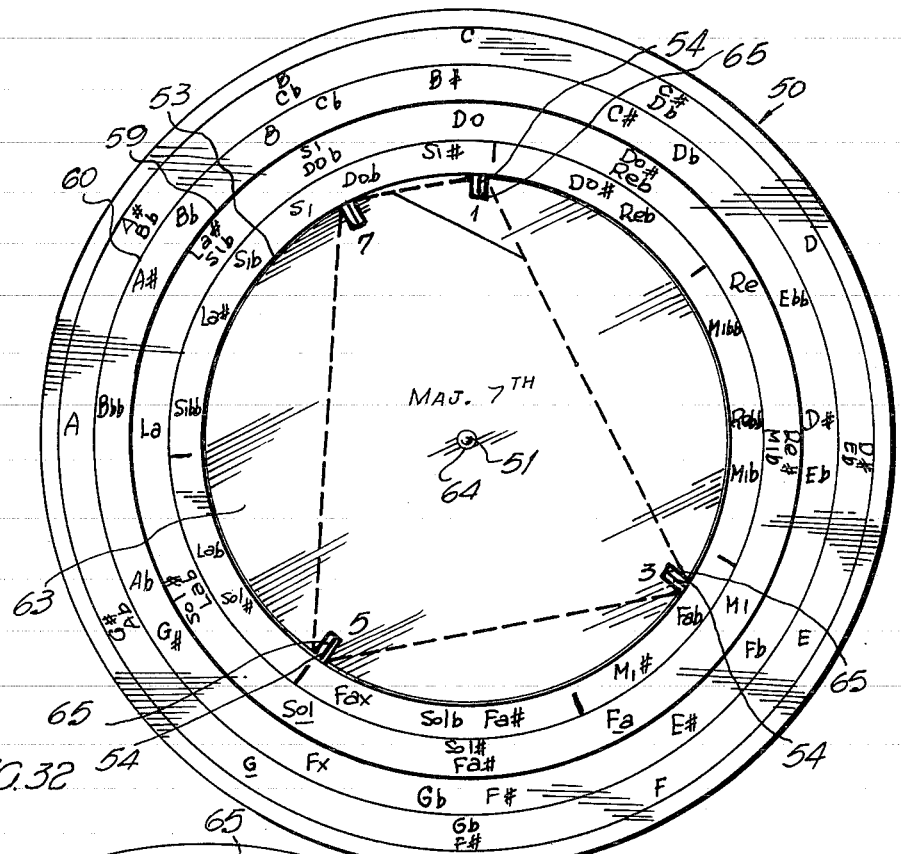
FIG. 32 is a plan view showing the main disk partially covered by application thereon of the FIG. 8 piece, indicating the do major seventh major chord.

FIG. 32 illustrates an example of application to determine formation of four-note chords. To such end disk-shaped piece 63 of FIG. 8 is placed over the main disk 50 so that bore 64 slides over spindle 51 and is rotatable thereabout. To determine the do major major-seventh chord, disk 63 is rotated until the notch 65 numbered 1 coincides with the mark 54 corresponding to do in main disk 50. One can then observe that, clockwise, the next notch 65 coincides with mark 54 for mi, the next notch 65 coincides with mark 54 for sol, while the last notch 65 is opposite the mark 54 for si. This shows that the do major major-seventh chord is comprised of notes mi, sol, si.

Figure 33:
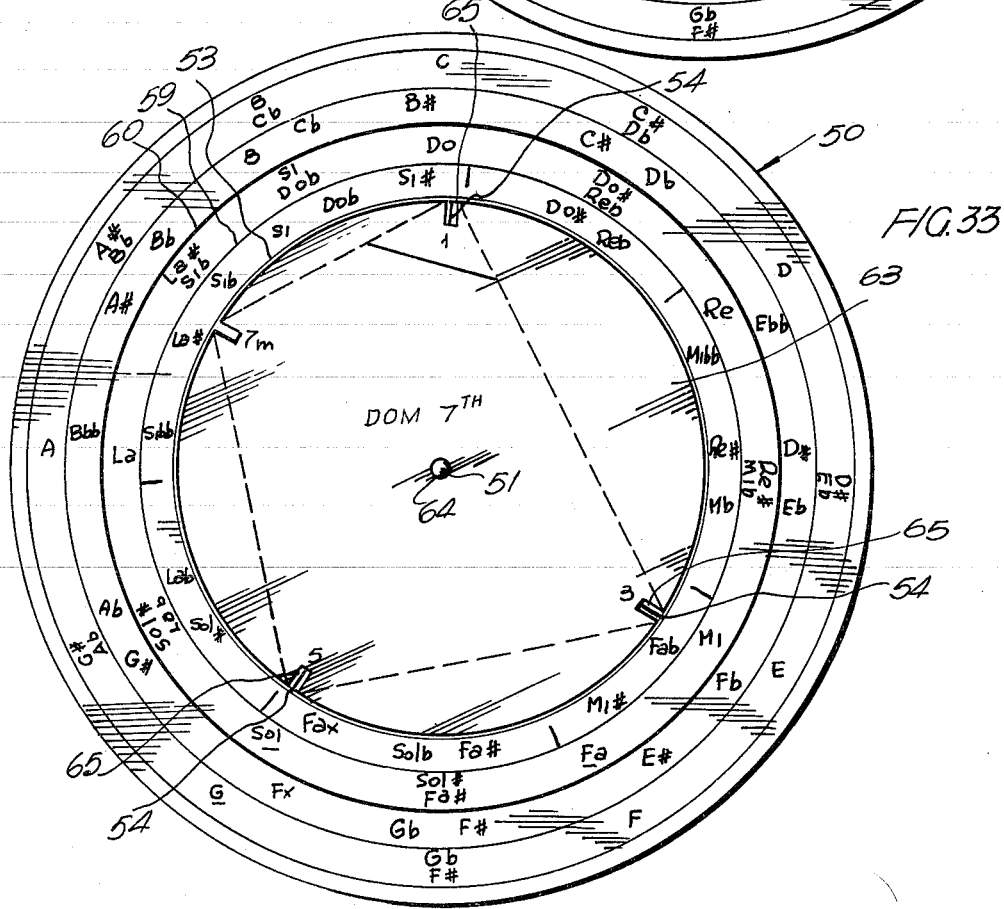
FIG. 33 is a plan view showing the main disk partially covered by application thereon of the FIG. 13 piece, indicating the do minor seventh major chord.

In FIG. 33 there is illustrated an example of application thereby to determine formation of a major chord of minor seventh of do. To such an end, disk 63 of FIG. 13 is placed over main disk 50 so bore 64 fits rotatably around spindle 51. Disk 63 is then rotated until notch 65 numbered 1 coincides with the mark 54 which corresponds to do in the main disk 50. One can then verify that the next notch 65, clockwise, faces the mark 54 for mi, the next notch 65 faces the mark 54 for sol and the next notch 65 faces the mark 54 for si flat. That is to say, the do minor seventh major chord is comprised of notes mi, sol and si flat.

Figure 22:
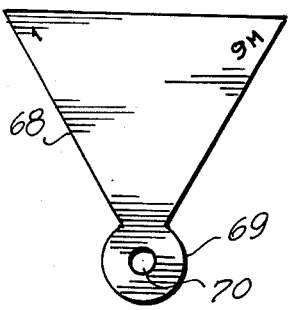
FIGS. 22 to 24 are plan views of triangular pieces which individually superposed on the pieces of FIGS. 8 to 21 allow formation of chords of five notes of the musical scale.

FIG. 22 illustrates an equilateral triangular piece 68, one of its vertices corresponding to the rotation axis and having an extended portion in the form of a washer 69 defining a bore 70 adapted to rotatably fit over spindle 51, while the converging sides are equal to the radius of innermost circumference 53 in main disk 50. One of the other two vertices is marked 1, while the other are is marked "9M", indicating major ninth.

Figure 23:
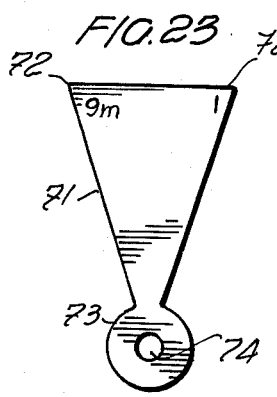

FIG. 23 shows a further triangular piece 71, having the shape of an isosceles triangle wherein equal angles 72 have 72.5° while the other is of 35°, the vertex of the latter constituting the axis of rotation of said triangular piece 71 and being provided with an extended portion in the form of a washr 73 which defines a bore 74 adapted for fitting rotatably over spindle 51 of the main disk 50, the equal side in the triangle having the same length as the radius of innermost circumference 53 of the main disk. One of the equal angles 72 is marked with a number 1, while the other one carries the indication "9m", meaning minor ninth.

Figure 24:
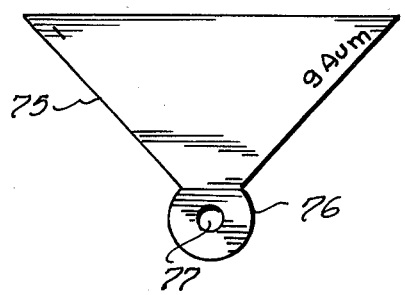

FIG. 24 shows a further triangular piece 75, constituted by an isosceles triangle having two equal angle of 47.5°, while the third angle is of 85° and its vertex constitutes the axis of rotation of the piece, to which purpose it is provided with an extended portion in the form of a washer 76 which defines a bore 77 adapted to fit rotatably over spindle 51 of the main disk 50. The sides converging on the greater angle are equal to the radius of innermost circumference 53. One of the vertices of the equal angles is marked 1, while the other one carries the inscription "9 Aum.", indicating the augmented ninth interval.

The three triangular pieces 68, 71 and 75 serve for determining five-note chords commonly denominated chords of ninth, when any one of them is superposed on one of the disk-shaped pieces 63 shown in FIGS. 8 to 21 placed on main disk 50.

Figure 34:
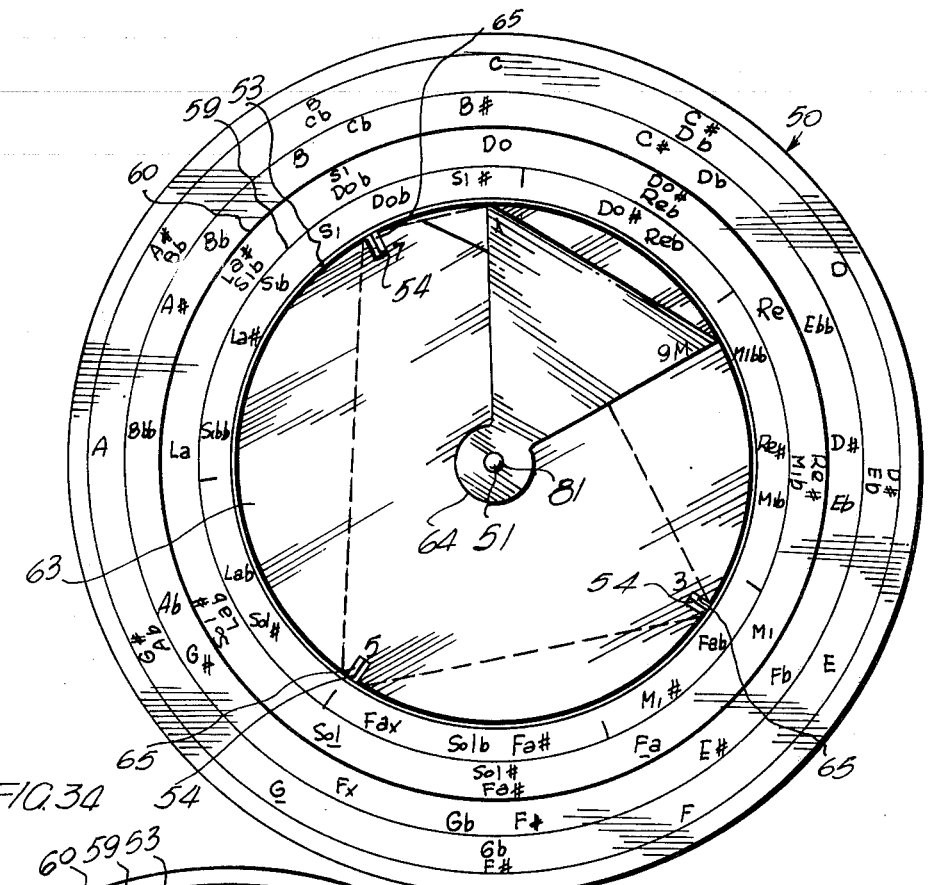
FIG. 34 is a plan view showing the main disk partially covered by application thereon of the disk of FIG. 8 and the triangular piece of FIG. 22, indicating the do major ninth chord.

As illustrated in FIG. 34, superposed on main disk 50 the discoid piece 63 of FIG. 8 is placed, whereby the major seventh major chord is determined, the notch 65 marked 1 being coincident with radial mark 54 for do. By superposing on discoid piece 63 the triangular piece 68 so that its bore 70 fits rotatably over spindly 51, and placing the vertex marked 1 opposite the radial mark 54 corresponding to do, the vertex marked "9 M" will point at radial mark 54 for re, so that it is seen that the do major ninth chord comprises notes mi, sol, si. re. As can be seen in FIG. 34, the effect of triangular piece 68 is to add to the basic chord indicated by discoid piece 63 an additional note, re, spaced a musical interval of a third from the next lower note, si.

Figure 26:
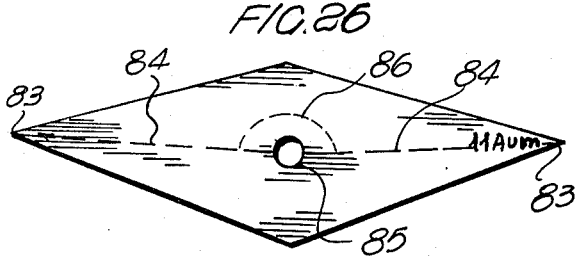
FIGS. 25 and 26 are plan views of polygonal pieces which individually superposed on the pieces of FIGS. 8 to 24 allow formation of chords of six notes on the musical scale.
Figure 25:
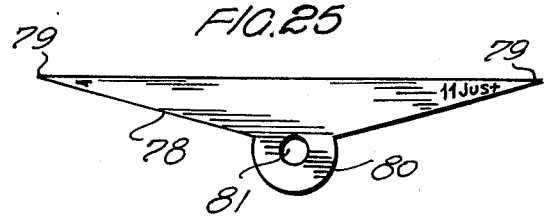

FIGS. 25 and 26 show polygonal pieces which superposed on disks 63 and pieces 68, or 71, or 75, permit determination of chords of six notes called elevenths.

FIG. 25 shows an isolceles triangular piece 78 the equal angles 79 of which are of 15° each, while the third angle has 150°, the vertex of the latter constituting the axis of rotation and being provided with an extended portion in the general form of a washer 80 which defines a bore 81 adapted to rotatably fit over spindle 51, the sides converging on said vertex, being equal to the radius of innermost circumference 53. One of the equal angles 79 is marked with the digit 1, while the other angle 79 is marked with the characters "11 J", indicating the just eleventh.

FIG. 26 shows a regular rhomboidal piece 82, the acute angles 83 whereof have their bisectors 84 forming at their intersection an angle 86 of 175° the vertex of which constitutes the axis of rotation of the rhomboidal piece 82 and is provided with a bore 85 for rotatably fitting the piece over the spindle 51, the length of each bisector 84 between vertices 83 and the angle 86 vertex equal to the radius of innermost circumference 53 of the main disk 50. One of the acute angles 83 is makred with a digit 1, while the other one is marked with the characters "11 Aum" which indicate the augmented eleventh.

Figure 35:
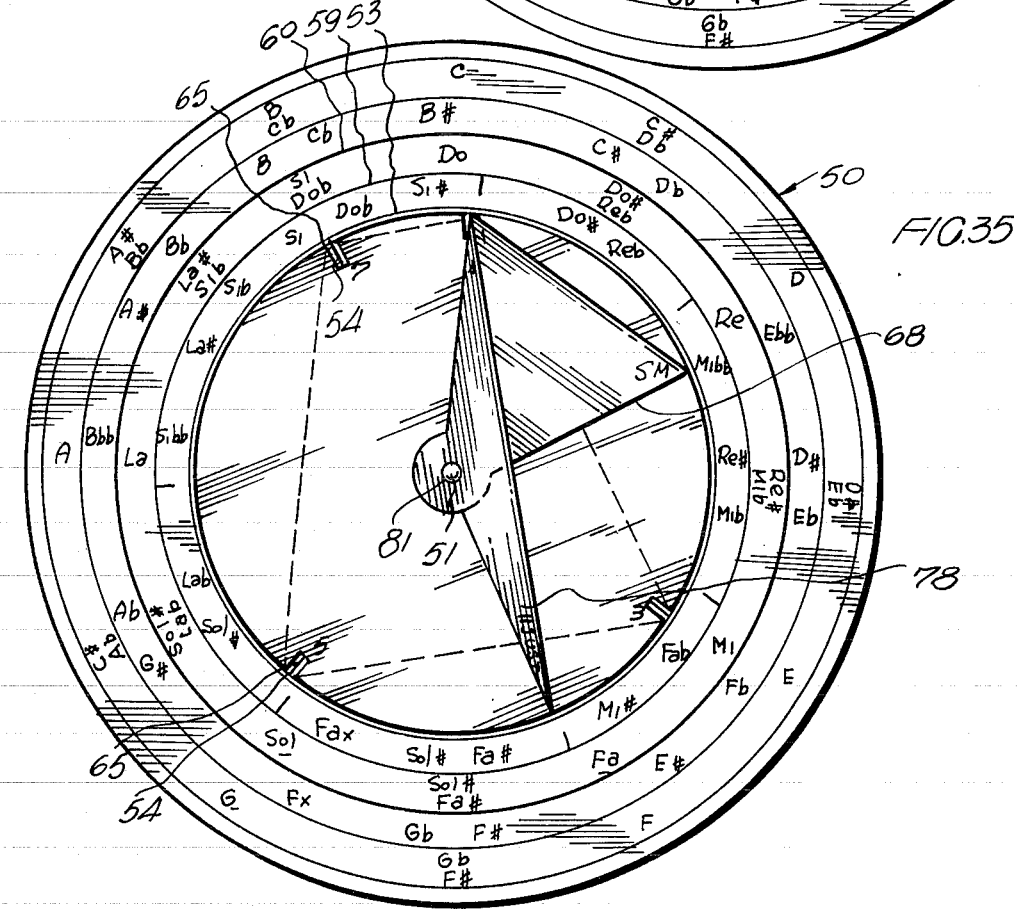
FIG. 35 is a plan view showing the main disk partially covered by application thereon of the disk of FIG. 8, the triangular piece of FIG. 22 and the triangular piece of FIG. 25, indicating the do just eleventh chord.

FIG. 35 shows how the triangular piece 78 is used for determining the just eleventh of the do chord. To such effect, disk 63 of FIG. 8 is placed over the main disk 50, which permits one to determine the major seventh major chord, with notch 65 identified with the digit 1 coinciding with radial mark 54 for do. Triangular piece 68 is next superposed on disk 63 with its bore 70 rotatably fitted over spindle 51, placing the vertex marked with the digit 1 in coincidence with radial mark 54 for do, so that the other vertex identified with characters "9M" points at re. Piece 78 is next superposed on piece 68 and disk 63 so that the bore 81 will rotatably fit over spindle 51, the vertex 79 marked with digit 1 being made to point at radial mark 54 for do, so that the other vertex 79 marked "11 J" will indicate the note fa. It is thus shown that the do just eleventh chord is formed by the following semitones: do, mi, sol, si, re, fa. Again, the effect of triangular piece 78 is to add to the basic chord indicated by discoid piece 63 and triangular piece 68 an additional note, fa, spaced a musical interval of a third from the next lower note, re.

FIG. 27 illustrates a triangular piece 87 formed by an isosceles right-angle triangle the right vertex of which constitutes the axis of rotation of the piece and is provided with an extended washer-like portion 88 defining a bore 89 for rotatably fitting the pieces over the spindle 51, the sides converging on the right angle being equal to the radius of the innermost circumference 53. One of the equal angles is marked with the digit 1, while the other one is marked with the characters "13 M" indicating a major thirteenth.

FIG. 28 illustrates a triangular piece 90 in the shape of an isosceles triangle the equal angles whereof are 32.5 degrees wide each, while the remaining angles is of 115 degrees, the vertex of the latter constituting the axis of rotation and being formed with an extended washer-like portion 91 defining a bore 92 adapted to rotatably fit over spindle 51, the equal sides of the triangle having each the same length as the radius of the main disk innermost circumference 53. One of the equal angles is identified by the numeral 1, while the other one carries the inscription "13 m" which indicates the minor thirteenth.

Figure 36:
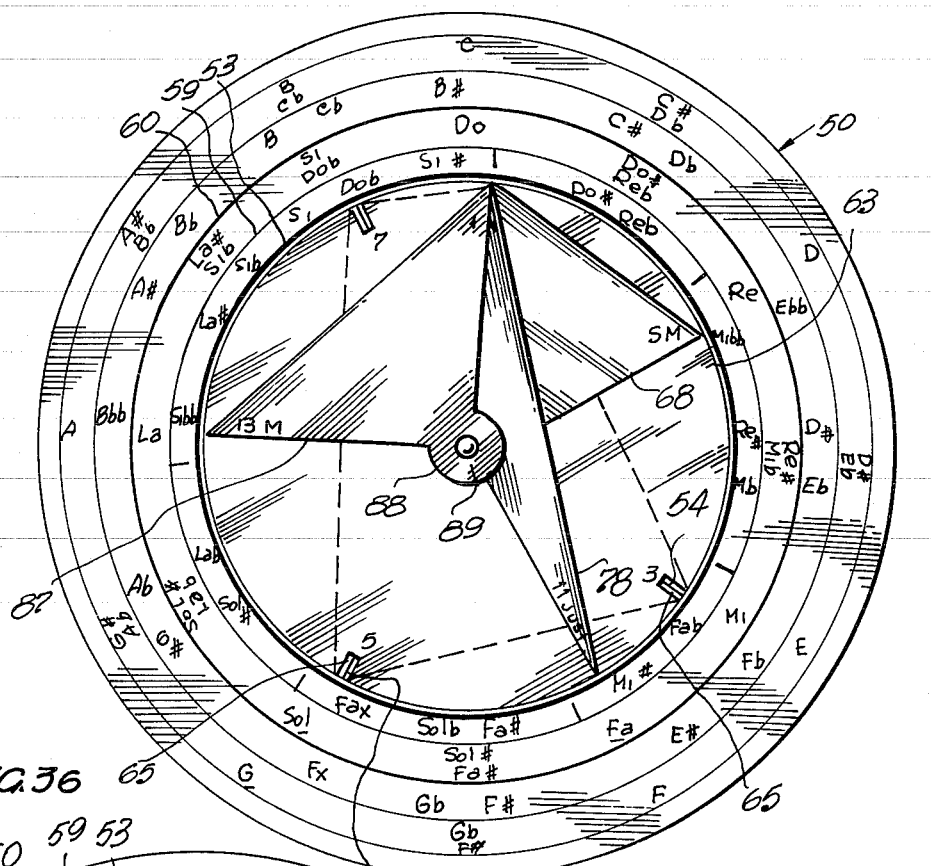
FIG. 36 is a plan view showing the main disk partially covered by application thereon of the disk of FIG. 8, the triangular piece of FIG. 22, the triangular piece of FIG. 25 and the triangular piece of FIG. 27, indicating the do major thirteenth chord.

FIG. 36 shows how piece 87 is employed for determining to do major thirteenth chord. Over main disk 50 one places the FIG. 8 disk 63, which permits determination of the major seventh major chord, with the notch 65 marked 1 pointing at radial mark 54 for do. Then on disk 63 triangular piece 68 is superposed so that bore 70 rotatably fits over spindle 51, rotating the piece until its vertex marked with numeral 1 coincides with radial mark 54 identified as do, so that the other vertex, marked with characters "9 M", points at radial mark 54 for re. Next, triangular piece 78 is superposed on piece 68 and disk 63 by fitting bore 81 over spindle 51, rotatably therearound, with the vertex 79 marked 1 pointing at the do radial mark 54, so that the other vertex 79, marked with characters "11 J", indicates fa. Finally triangular pieces 87 is superposed on triangular pieces 78 and 68 and disk 63, with its bore 89 rotatably fitted over spindle 51, so that the vertex marked with numeral 1 is placed pointing at radial mark 54 for do and the other vertex identified by characters "13 M" indicates la. Thus arranged, the abacus indicates that the do major thirteenth chord is comprised of the following degrees: do, mi, sol, si, re, fa, la. As previously illustrated in FIGS. 34 and 35, triangular piece 87 adds to the basic chord indicated by disk 63 and triangular pieces 68 and 78 an additional note, 1a, spaced a musical interval of a third from the next lower note, fa.

FIGS. 29 and 30 illustrate two triangular pieces which in combination with the main disk 50 serve to determine the six chords in each tonality in the twelve semitones in the tempered musical scale, as well as the relative major and minor tones.

In additional functions, they would serve in the processes of enharmonic modulation, change of mode modulation, etc., as well as in tonal transposition of musical works, or in the design of tonal planes.

FIG. 29 illustrates a flat triangular piece 93 consisting of an acute-anlge isoceles triangle having a top angle 94 of 30° and two equal angles 95 of 75° each, the vertices being inscribed in a circumference of the same diameter as the main disk innermost circumference 53, the center of said circumference constituting the axis of rotation of triangular piece 93, which at said center is provided with a bore 96 adapted for rotatably fitting over spindle 51. The 30° angle is marked with digit 1, while the lower left-hand (as seen in FIG. 29) 75° angle bears the inscription "5 Dom" and the right-hand angle is inscribed "S-Dom", which stand for "dominant fifth" and "subdominant".

Said piece 93 applied over the main disk 50 so that bore 96 will rotatably fit over spindle 51, is made to point the vertex of angle 94 at radial mark 54 for do, while angles 95 indicate on main disk 50, the radial marks 54 corresponding to sol and fa which constitute the chords tonally related to the do chord.

FIG. 30 shows in turn a flat triangular piece 97 consisting in a right-angle isosceles triangle, the right angle vertex whereof constitutes the axis of rotation of the piece, said vertex having an extended washer-like portion 98 defining a bore 99 adapted to rotatably fit over spindle 51, the equal sides of the triangle being each equal in length to the radius of the main disk innermost circumference 53, the free vertices being respectively identified by inscriptions "major" and "minor".

This triangular piece 97 is employed in combination with triangular piece 93 and serves to determine the relative major and minor tones of the chords of the twelve semitones in the tempered musical scale.

Figure 37:
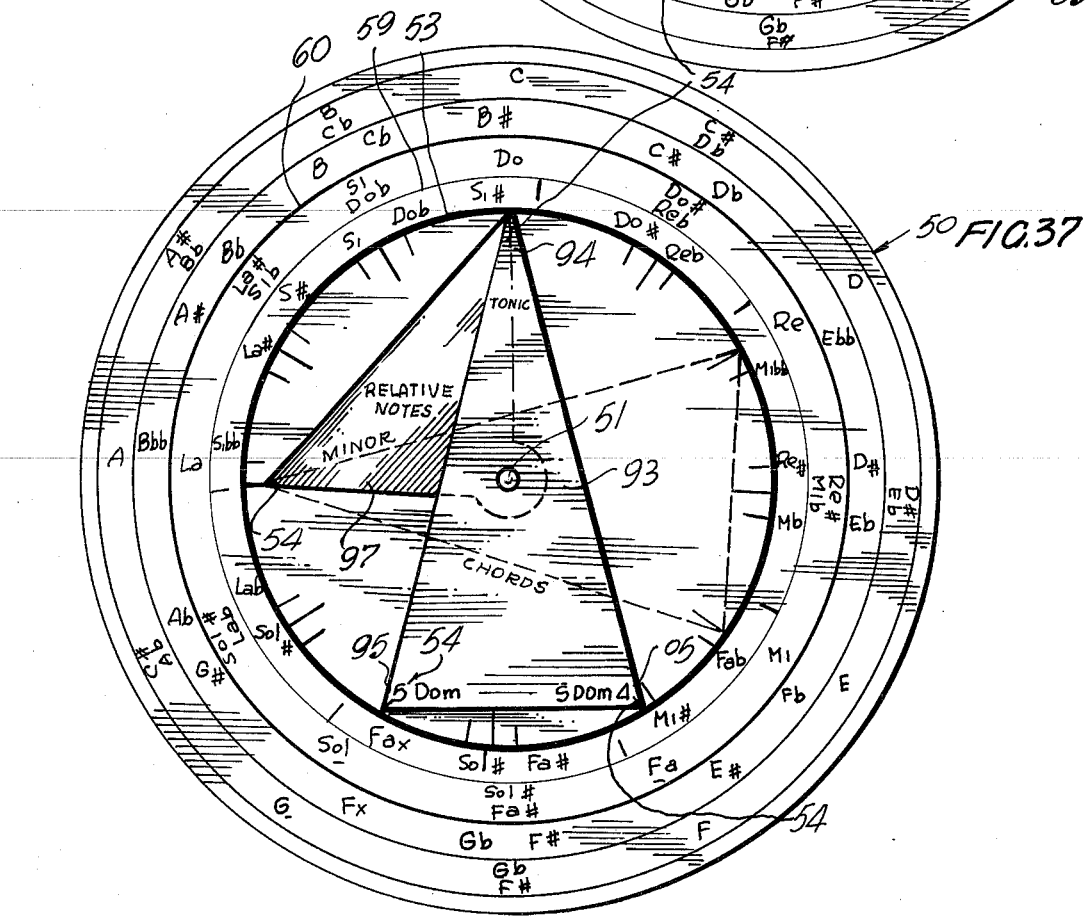
FIG. 37 is a plan view showing the main disk partially covered by application thereon of the triangular piece of FIG. 29, and the triangular piece of FIG. 30 which superposed indicate the tonal chords and the relative chords, major and minor, the latter in dotted lines, of the notes in the musical scale.

As illustrated by FIG. 37, the main disk 50 receives on its surface 52 piece 97, rotatably fitted over spindle 51, with the vertex marked "major" coincident with radial mark 54 corresponding to do; then piece 93 is superposed with bore 96 sliding over spindle 51, so positioned that vertex 94, bearing numeral 1, will point at the do radial mark 54, and thus the vertices of angles 95 will mark the sol major and fa major chords; next, piece 93 is rotated over spindle 51 until the vertex of angle 94 coincides with the vertex of piece 97 marked "minor", thus determining that the relative minor tone of do is la minor, with re minor and mi minor indicated by the vertices of angles 95.

In additional functions, these pieces would serve in the processes of enharmonic modulation, change of mode modulation, etc., as well as in tonal transposition of musical works, or in the design of tonal planes.

I claim:

1. A chord calculator comprising a main disk having a central upstanding spindle and spaced from and centered on said spindle a circularly annular array of twelve angularly equispaced indicia corresponding to the notes of the chromatic scale; a plurality of chord indicators each having a central hole adapted to fit over said spindle and each fitting within said array, each chord indicator having at least three and at most four formations one of which is alignable with a chord root note and the others of which are alignable with the other notes of a respective basic chord; and a plurality of interval indicators for adding additional notes to said basic chord, each of said interval indicators being of generally triangular shape and having one apex formed with a throughgoing hole adapted to fit over said spindle and two other apices alignable respectively with a chord root note and with another note spaced by a musical interval of a third from the next lower note.

2. The calculator defined in claim 1, wherein said interval indicators have a length between their said other apices and the respective hole approximately equal to the radial spacing of said array from said spindle.

3. The calculator defined in claim 2, wherein said chord indicators are disks fitting within said array and formed with peripheral notches constituting said formations.

4. The calculator defined in claim 2, wherein said chord indicators are flat polygons having corners constituting said formations.

5. The calculator defined in claim 2, wherein one of said chord indicators has its formations spaced arcuately 120°, 90° and 150° about its respective hole, whereby said one indicator indicates the notes of a major chord.

6. The calculator defined in claim 2, wherein one of said chord indicators has its formations spaced arcuately 120°, 115° and 125° about its respective hole, whereby said one indicator indicates the notes of an augmented fifth chord.

7. The calculator defined in claim 2, wherein one of said chord indicators has its formations spaced arcuately 120°, 90°, 120° and 30° about its respective hole, whereby said one indicator indicates the notes of a major major-seventh chord.

8. The calculator defined in claim 2, wherein one of said chord indicators has its formations spaced arcuately 90°, 120°, 120° and 30° about its respective hole, whereby said one indicator indicates the notes of a minor major-seventh chord.

9. The calculator defined in claim 2, wherein one of said chord indicators has its formations spaced arcuately 90°, 95°, 140° and 35° about its respective hole, whereby said one indicator indicates the notes of a major-seventh diminished chord.

10. The calculator defined in claim 2, wherein one of said chord indicators has its formations spaced arcuately 120°, 90°, 90° and 60° about its respective hole, whereby said one indicator indicates the notes of a minor major-seventh chord.

11. The calculator defined in claim 2, wherein one of said chord indicators has its formations spaced arcuately 90°, 120°, 90° and 60° about its respective hole, whereby said one indicator indicates the notes of a minor-seventh chord.

12. The calculator defined in claim 2, wherein one of said chord indicators has its formations spaced arcuately 120°, 90°, 60° and 90° about its respective hole, whereby said one indicator indicates the notes of a major major-sixth chord.

13. The calculator defined in claim 2, wherein one of said chord indicators has its formations spaced arcuately 90°, 120°, 30° and 120° about its respective hole, whereby said one indicator indicates the notes of a minor major-sixth chord.

14. The calculator defined in claim 2, wherein one of said chord indicators has its formations spaced arcuately 90°, 120°, 60° and 90° about its respective hole, whereby said one indicator indicates the notes of a minor minor-sixth chord.

15. The calculator defined in claim 2, wherein one of said chord indicators has its formations spaced arcuately 90°, 120° and 150° about its respective hole, whereby said one indicator indicates the notes of a minor chord.

16. The calculator defined in claim 2, wherein said main disk carries a second circular array of indicia offset 5° to one side of the first-mentioned array of indicia and a third circular array of indicia offset 5° to the other side of said first-mentioned array, said first array indicating the well-tempered scale and said second and third arrays indicating consecutive flatted fifths and consecutive sharped fifths, respectively.

17. The calculator defined in claim 16, wherein one of said chord indicators has its formations spaced arcuately 120°, 65° and 175° about its respective hole, whereby said one indicator indicates the notes of a diminished fifth chord.

18. The calculator defined in claim 16, wherein one of said chord indicators has its formations spaced arcuately 90°, 95° and 175° about its respective hole, whereby said one indicator indicates the notes of a diminished chord.

19. The calculator defined in claim 16, wherein one of said chord indicators has its formations spaced arcuately 120°, 115°, 90° and 35° about its respective hole, whereby said one indicator indicates the notes of a major-seventh augmented chord.

20. The calculator defined in claim 16, wherein one of said chord indicators has its formations spaced arcuately 120°, 65°, 140° and 35° about its respective hole, whereby said one indicator indicates the notes of a major-seventh diminished-fifth chord.

21. The calculator defined in claim 16, wherein one of said chord indicators has its formations spaced arcuately 120°, 115°, 65° and 60° about its respective hole, whereby said one indicator indicates the notes of a minor-seventh augmented-fifth chord.

22. The calculator defined in claim 16, wherein one of said chord indicators has its formations spaced arcuately 120°, 65°, 120° and 55° about its respective hole, whereby said one indicator indicates the notes of a minor-seventh diminished-fifth chord.

23. The calculator defined in claim 16, wherein one of said chord indicators has its formations spaced arcuately 90°, 95°, 115° and 60° about its respective hole, whereby said one indicator indicates the notes of a minor-seventh diminished chord.

24. The calculator defined in claim 16, wherein one of said chord indicators has its formations spaced arcuately 65°, 120° and 175° about its respective hole, whereby said one indicator indicates the notes of a diminished third chord.

25. The calculator defined in claim 16, wherein one of said chord indicators has its formations spaced arcuately 90°, 95°, 90° and 85° about its respective hole, whereby said one indicator indicates the notes of a diminished-seventh diminished chord.

26. The calculator defined in claim 2, wherein one of said interval indicators has the shape of an equilateral triangle, whereby said one interval indicator indicates the major-ninth above the root.

27. The calculator defined in claim 2, wherein one of said interval indicators has an angle of 35° at its said one apex and angles of 72.5° at its said other apices, whereby said one interval indicator indicates the minor ninth above the root.

28. The calculator defined in claim 2, wherein one of said interval indicators has an angle of 85° at its said one apex and angles of 47.5° at its said other apices, whereby said one interval indicator indicates the augmented ninth above the root.

29. The calculator defined in claim 2, wherein one of said interval indicators has an angle of 150° at its said one apex and angles of 15° at its said other apices, whereby said one interval indicator indicate the just eleventh above the root.

30. The calculator defined in claim 2, wherein one of said interval indicators has an angle of 90° at its said one apex and angles of 45° at its said other apices, whereby said one interval indicator indicates the just major thirteenth above the root.

31. The calculator defined in claim 2; further comprising an additional interval indicator formed as a flat polygonal piece having a throughgoing hole adapted to fit over said spindle and shaped generally as a regular rhombus centered on the respective hole and having one corner whose bisectors drawn to said hole form an angle of 175°, whereby said additional indicator indicates the augmented eleventh above the root.

32. The calculator defined in claim 2, wherein one of said interval indicators has an angle of 115° at its said one apex and angles of 32.5° at its said other apices, whereby said one interval indicator indicates the minor thirteenth above the root.

* * * * *